US010975963B2

United States Patent
Hiura et al.

(10) Patent No.: US 10,975,963 B2
(45) Date of Patent: Apr. 13, 2021

(54) CONTROL APPARATUS FOR VEHICLE

(71) Applicant: TOYOTA JIDOSHA KABUSHIKI KAISHA, Toyota (JP)

(72) Inventors: Naoki Hiura, Toyota (JP); Hiroyuki Aono, Nagoya (JP); Hitoshi Matsunaga, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/712,637

(22) Filed: Dec. 12, 2019

(65) Prior Publication Data

US 2020/0248797 A1 Aug. 6, 2020

(30) Foreign Application Priority Data

Feb. 1, 2019 (JP) .............................. JP2019-017491

(51) Int. Cl.
*F16H 61/04* (2006.01)
*F16H 61/4183* (2010.01)
(Continued)

(52) U.S. Cl.
CPC ....... *F16H 61/4183* (2013.01); *F16D 48/066* (2013.01); *F16H 2061/0474* (2013.01);
(Continued)

(58) Field of Classification Search
CPC ...... F16H 59/68; F16H 61/04; F16H 61/0437; F16H 61/4183; F16H 2061/0418;
(Continued)

(56) References Cited

U.S. PATENT DOCUMENTS 5,669,849 A * 9/1997 Tabata ................ F16H 61/0437
477/102
6,270,444 B1 * 8/2001 Tsutsui ................ F16H 61/0437
475/127
(Continued)

FOREIGN PATENT DOCUMENTS

CN 105937562 A 9/2016
JP 2004-347066 A 12/2004
(Continued)

*Primary Examiner* — Edwin A Young
(74) *Attorney, Agent, or Firm* — Oliff PLC

(57) ABSTRACT

Torque reduction control is executed for temporarily reducing a torque capacity of a reaction engagement device during a transition of a shift. The reaction engagement device is maintained in an engaged state from before the shift to after the shift such that a predetermined rotating element in an automatic transmission bears a reaction caused by progress of the shift resulting from a change of an engaging-side engagement device into an engaged state. Therefore, without delaying a change of the engaging-side engagement device into the engaged state, transmission of torque that is generated as a result of rattling during a transition of a shift is reduced. Thus, in shift control over the automatic transmission, shock at the time of rattling is reduced while a stop of a shift due to a delay in change of the engaging-side engagement device into the engaged state is prevented.

7 Claims, 7 Drawing Sheets

(51) Int. Cl.
 *F16D 48/06* (2006.01)
 *F16H 61/12* (2010.01)
 *F16H 61/28* (2006.01)

(52) U.S. Cl.
 CPC ............... *F16H 2061/1224* (2013.01); *F16H 2061/2823* (2013.01)

(58) Field of Classification Search
 CPC ..... F16H 2061/0462; F16H 2061/0466; F16H 2061/0485; F16H 2061/0488; F16D 48/066
 See application file for complete search history.

(56) References Cited

U.S. PATENT DOCUMENTS

| | | | |
|---|---|---|---|
| 2010/0087287 A1* | 4/2010 | Tabata | B60W 30/19 477/3 |
| 2011/0230308 A1* | 9/2011 | Inoue | F02D 41/023 477/54 |
| 2012/0283064 A1* | 11/2012 | Herbeth | F16H 61/04 475/275 |
| 2013/0304293 A1 | 11/2013 | Yoshikawa et al. | |
| 2016/0258529 A1 | 9/2016 | Kuwahara et al. | |
| 2018/0363776 A1* | 12/2018 | Shimozawa | F16H 3/091 |

FOREIGN PATENT DOCUMENTS

| | | |
|---|---|---|
| JP | 2009-203953 A | 9/2009 |
| JP | 5609993 B2 | 10/2014 |

\* cited by examiner

| | C1 | C2 | C3 | C4 | B1 | B2 |
|---|---|---|---|---|---|---|
| 1st | ○ | ○ | | | | ○ |
| 2nd | ○ | | | | ○ | ○ |
| 3rd | | ○ | | | ○ | ○ |
| 4th | | | | ○ | ○ | ○ |
| 5th | | ○ | | ○ | ○ | |
| 6th | ○ | | | ○ | ○ | |
| 7th | ○ | | ○ | ○ | | |
| 8th | | | ○ | ○ | ○ | |
| 9th | ○ | | ○ | | ○ | |
| 10th | | ○ | ○ | | ○ | |
| N | | ○ | | | | ○ |
| Rev | | ○ | ○ | | | ○ |

○ : ENGAGED

CONTROL APPARATUS FOR VEHICLE

INCORPORATION BY REFERENCE

The disclosure of Japanese Patent Application No. 2019-017491 filed on Feb. 1, 2019 including the specification, drawings and abstract is incorporated herein by reference in its entirety.

BACKGROUND

1. Technical Field

The disclosure relates to a control apparatus for a vehicle including an automatic transmission.

2. Description of Related Art

There is well known a control apparatus for a vehicle including an automatic transmission that shifts gears by changing the operating statuses of predetermined ones of a plurality of engagement devices. This is, for example, a control apparatus for a vehicle, described in Japanese Unexamined Patent Application Publication No. 2004-347066 (JP 2004-347066 A). JP 2004-347066 A describes that, when a backlash, that is, looseness, in mechanical components that make up a drive system of the vehicle, is left at the time when an automatic transmission is caused to perform shift operation, a hydraulic pressure command value, decreased as compared to normal times, for an engaging-side engagement device to be engaged in the shift operation of the automatic transmission is maintained for a predetermined duration from the start of engagement to gently engage the engaging-side engagement device and, as a result, shock at the time of rattling caused by removal of the looseness is prevented.

SUMMARY

Incidentally, when a hydraulic pressure that is supplied to an engagement device is decreased to reduce shock at the time of rattling as described above, a change of the engaging-side engagement device into an engaged state can delay to extend a duration required for shift control, that is, the progress of a shift can stop. A stop of a shift leads to a decrease in drivability.

The disclosure provides a control apparatus for a vehicle, which is able to reduce shock at the time of rattling while preventing a stop of shift due to a delay in change of an engaging-side engagement device into an engaged state in shift control over an automatic transmission.

An aspect of the disclosure provides a control apparatus for a vehicle including an automatic transmission that shifts gears by changing operating statuses of predetermined ones of a plurality of engagement devices. The control apparatus includes a shift control unit configured to execute torque reduction control. The torque reduction control is control for temporarily reducing a torque capacity of a reaction engagement device different from the predetermined ones of the plurality of engagement devices. The reaction engagement device is maintained in an engaged state from before the shift to after the shift such that a predetermined rotating element in the automatic transmission bears a reaction caused by progress of the shift resulting from a change of an engaging-side one of the predetermined engagement devices, which has been in a released state before the shift, into an engaged state.

In the control apparatus according to the above aspect, the shift on which the torque reduction control is executed may be a predetermined shift that requires a reduction of shock at the time of rattling caused by removal of looseness in the automatic transmission.

In the control apparatus according to the above aspect, the shift control unit may be configured to execute the torque reduction control by setting a command pressure for controlling the torque capacity of the reaction engagement device such that the torque capacity is reduced before looseness in the automatic transmission is removed with the shift.

In the control apparatus according to the above aspect, the shift control unit may be configured to set the command pressure for reducing the torque capacity of the reaction engagement device according to a slip rotation speed of the reaction engagement device that is half engaged in the torque reduction control.

In the control apparatus according to the above aspect, the shift control unit may be configured to set the command pressure for reducing the torque capacity of the reaction engagement device according to predetermined specifications of the reaction engagement device.

In the control apparatus according to the above aspect, the shift control unit may be configured to set the command pressure for reducing the torque capacity of the reaction engagement device such that transmission of torque that is generated at the time of rattling caused by removal of looseness resulting from the shift in the automatic transmission is reduced.

In the control apparatus according to the above aspect, the shift control unit may be configured to, after looseness in the automatic transmission is removed with the shift, set the command pressure for returning the reaction engagement device to an engaged state before completion of control for changing the engaging-side engagement device into the engaged state.

According to the above aspect, torque reduction control is executed for temporarily reducing the torque capacity of the reaction engagement device during a transition of a shift. The reaction engagement device is maintained in the engaged state from before the shift to after the shift such that the predetermined rotating element in the automatic transmission bears a reaction caused by progress of the shift resulting from a change of the engaging-side engagement device into the engaged state. Therefore, without delaying a change of the engaging-side engagement device into the engaged state, transmission of torque that is generated as a result of rattling during the transition of the shift is reduced. Thus, in shift control over the automatic transmission, shock at the time of rattling is reduced while a stop of a shift due to a delay in change of the engaging-side engagement device into the engaged state is prevented.

According to the above aspect, the shift on which the torque reduction control is executed is a predetermined shift that requires a reduction of shock at the time of rattling. Therefore, in a shift that does not require a reduction of shock at the time of rattling, torque reduction control is not executed, so there is no possibility that a duration required for shift control extends because of torque reduction control, and shift control is simple.

According to the above aspect, the torque reduction control is executed by setting the command pressure for controlling the torque capacity of the reaction engagement device such that the torque capacity is reduced before looseness in the automatic transmission is removed with a shift. Therefore, transmission of torque that is generated as a result of rattling during a transition of a shift is appropriately reduced.

According to the above aspect, the command pressure for reducing the torque capacity of the reaction engagement device is set according to the slip rotation speed of the reaction engagement device. Therefore, the sensitivity of transmission of torque that varies with the slip rotation speed of the reaction engagement device can be set to a desired level. Thus, transmission of torque is appropriately reduced at a slip rotation speed of the reaction engagement device appropriate for each type of a shift that varies in the magnitude of torque that is generated as a result of rattling.

According to the above aspect, the command pressure for reducing the torque capacity of the reaction engagement device is set according to the predetermined specifications of the reaction engagement device. Therefore, such a command pressure that the response at the time of returning the reaction engagement device to an engaged state is appropriately ensured can be set.

According to the above aspect, the command pressure for reducing the torque capacity of the reaction engagement device is set such that transmission of torque that is generated at the time of rattling is reduced. Therefore, transmission of torque that is generated as a result of rattling during a transition of a shift is appropriately reduced.

According to the above aspect, after looseness in the automatic transmission is removed with a shift, a command pressure is set such that the reaction engagement device is returned to an engaged state before completion of control for changing the engaging-side engagement device to an engaged state. Therefore, a delay in termination of shift control due to torque reduction control is prevented.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, an embodiment of the disclosure will be described in detail with reference to the accompanying drawings.

First Embodiment

Figure 1:
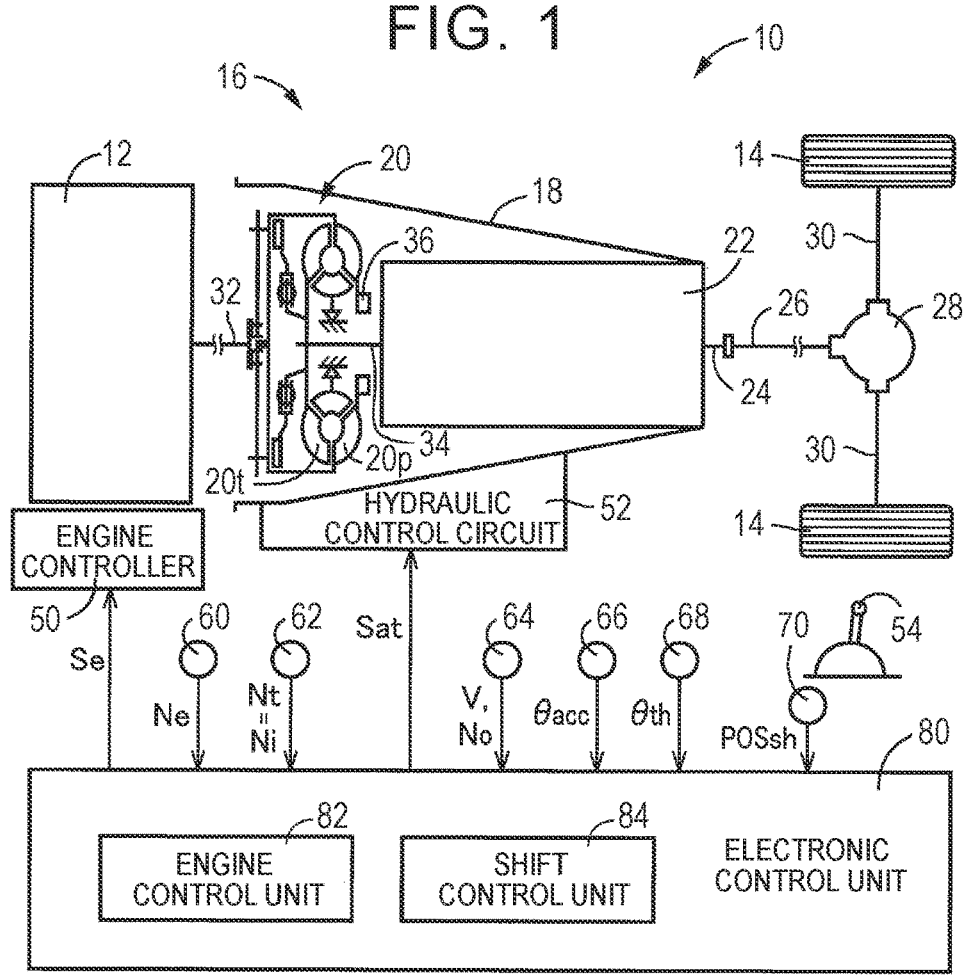
FIG. 1 is a diagram that illustrates the schematic configuration of a vehicle to which the disclosure is applied and is a diagram that illustrates a relevant part of control functions and control system for various control in the vehicle.

FIG. 1 is a diagram that illustrates the schematic configuration of a vehicle 10 to which the disclosure is applied and is a diagram that illustrates a relevant part of a control system for various control in the vehicle 10. As shown in FIG. 1, the vehicle 10 includes an engine 12 as a power source, drive wheels 14, and a power transmission device 16 provided in a power transmission path between the engine 12 and the drive wheels 14. The power transmission device 16 includes a torque converter 20 and an automatic transmission 22, disposed inside a case 18 that is a non-rotating member connected to a vehicle body. The power transmission device 16 includes a propeller shaft 26, a differential gear 28, a pair of drive shafts 30, and other parts. The propeller shaft 26 is coupled to a transmission output shaft 24 that is an output rotating member of the automatic transmission 22. The differential gear 28 is coupled to the propeller shaft 26. The pair of drive shafts 30 is coupled to the differential gear 28. In the power transmission device 16, power output from the engine 12 is transmitted to the drive wheels 14 sequentially via the torque converter 20, the automatic transmission 22, the propeller shaft 26, the differential gear 28, the drive shafts 30, and the like. The power is synonymous with torque and force unless otherwise distinguished.

An engine torque Te of the engine 12, which is an output torque of the engine 12, is controlled by an electronic control unit 80 (described later) controlling an engine controller 50 such as a throttle actuator, a fuel injection device, and an ignition device, provided in the vehicle 10.

The torque converter 20 is disposed in a power transmission path between the engine 12 and the automatic transmission 22. The torque converter 20 is a fluid transmission device including a pump impeller 20$p$ and a turbine runner 20$t$. The pump impeller 20$p$ is an input rotating member of the torque converter 20 and is coupled to a crankshaft 32 of the engine 12. The turbine runner 20$t$ is an output rotating member of the torque converter 20 and is coupled to a transmission input shaft 34 that is an input rotating member of the automatic transmission 22. The transmission input shaft 34 is also a turbine shaft. The power transmission device 16 further includes a mechanical oil pump 36 coupled to the pump impeller 20$p$. When the oil pump 36 is driven for rotation by the engine 12, the oil pump 36 is used in shift control over the automatic transmission 22 or discharge hydraulic fluid for supplying lubricating oil to various portions of the power transmission device 16. In other words, hydraulic fluid drawn by the oil pump 36 is supplied as a source pressure of the hydraulic control circuit 52 provided in the vehicle 10.

Figure 2:
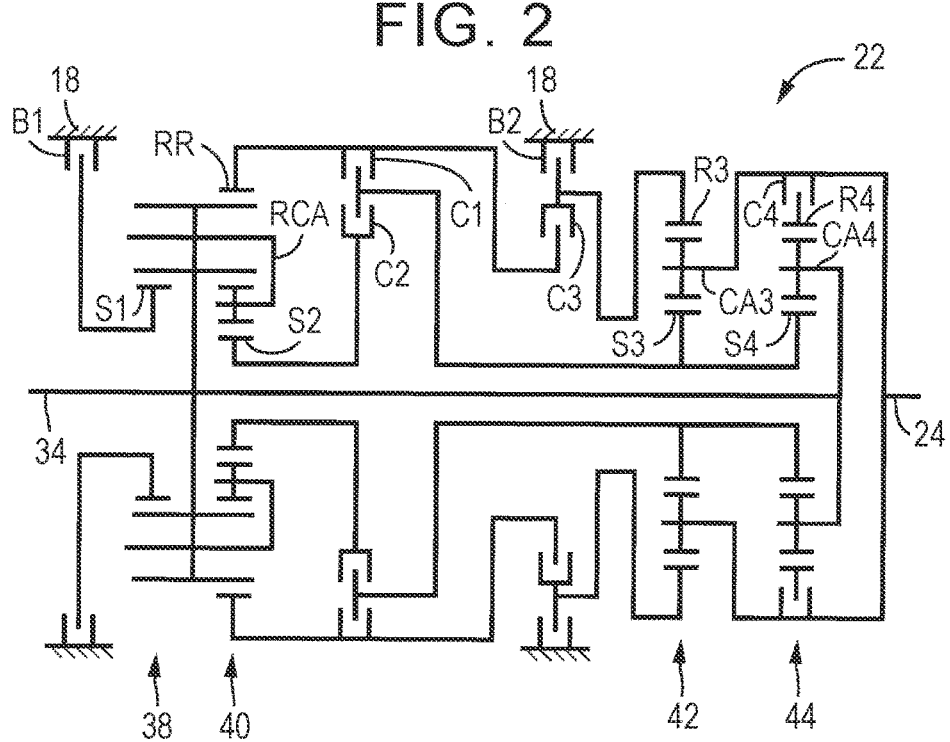
FIG. 2 is a skeletal diagram that illustrates an example of an automatic transmission.

FIG. 2 is a skeletal diagram that illustrates an example of the automatic transmission 22. As shown in FIG. 2, the automatic transmission 22 is a stepped transmission that is part of the power transmission path between the engine 12 and the drive wheels 14. The automatic transmission 22 is a known planetary gear automatic transmission including a plurality of sets of planetary gear trains and a plurality of engagement devices. The plurality of sets of planetary gear trains includes a first planetary gear train 38, a second planetary gear train 40, a third planetary gear train 42, and a fourth planetary gear train 44. The plurality of engagement devices includes a first clutch C1, a second clutch C2, a third clutch C3, a fourth clutch C4, a first brake B1, and a second brake B2. In the present embodiment, unless otherwise distinguished, the plurality of engagement devices is simply referred to as engagement devices CB.

Each of the engagement devices CB is a hydraulic frictional engagement device that is a multiple disc or single disc clutch or brake that is pressed by a hydraulic actuator, a band brake that is fastened by a hydraulic actuator, or the like. An operating status, such as an engaged state and a released state, of each of the engagement devices CB is changed by changing an engaging torque Tcb that is a torque capacity by using an engaging hydraulic pressure PRcb as a regulated engaging pressure for the engagement device CB, output from a solenoid valve, or the like, in the hydraulic control circuit 52 For example, to transmit an AT input torque Ti, which is an input torque to be input to the automatic transmission 22, between the transmission input shaft 34 and the transmission output shaft 24 without a slip of the engagement device CB, that is, a differential rotation speed in the engagement device CB, a torque capacity (=engaging torque Tcb) that provides a portion of transmission torque that each of the engagement devices CB needs to bear for the AT input torque Ti (=Engaging torque Tcb) is required. The portion of transmission torque is a torque assigned to each of the engagement devices CB.

In the automatic transmission 22, the rotating elements of the plurality of sets of the planetary gear trains 38, 40, 42, 44 are partially coupled to each other or coupled to the transmission input shaft 34, the case 18, or the transmission output shaft 24, directly or indirectly via the engagement device CB. The rotating elements of the first planetary gear train 38 are a first sun gear S1, a carrier RCA, and a ring gear RR. The rotating elements of the second planetary gear train 40 are a second sun gear S2, the carrier RCA, and the ring gear RR. The rotating elements of the third planetary gear train 42 are a third sun gear S3, a third carrier CA3, and a third ring gear R3. The rotating elements of the fourth planetary gear train 44 are a fourth sun gear S4, a fourth carrier CA4, and a fourth ring gear R4. In the first planetary gear train 38 and the second planetary gear train 40, the common carrier RCA serves as both carriers, and the common ring gear RR serves as both ring gears, that is, a so-called Ravigneaux-type planetary gear train is employed.

The automatic transmission 22 is a stepped transmission in which a plurality of shift stages having different speed ratios γ (=AT input rotation speed Ni/AT output rotation speed No) is selectively established by selectively engaging the engagement devices CB. In other words, the automatic transmission 22 shift gears by changing the operating statuses of predetermined ones of the engagement devices CB. The AT input rotation speed Ni is the input rotation speed of the automatic transmission 22, which is the rotation speed of the transmission input shaft 34, and can be expressed by a turbine rotation speed Nt. The AT output rotation speed No is the output rotation speed of the automatic transmission 22, which is the rotation speed of the transmission output shaft 24. The speed ratio γ of the automatic transmission 22, which corresponds to each shift stage, is determined as needed by the gear ratios (=Number of teeth of sun gear/Number of teeth of ring gear) ρ1, ρ2, ρ3, ρ4 of the plurality of sets of planetary gear trains 38, 40, 42, 44. A speed ratio is synonymous with a gear ratio, and a shift stage is synonymous with a gear stage.

Figures 3, 4:
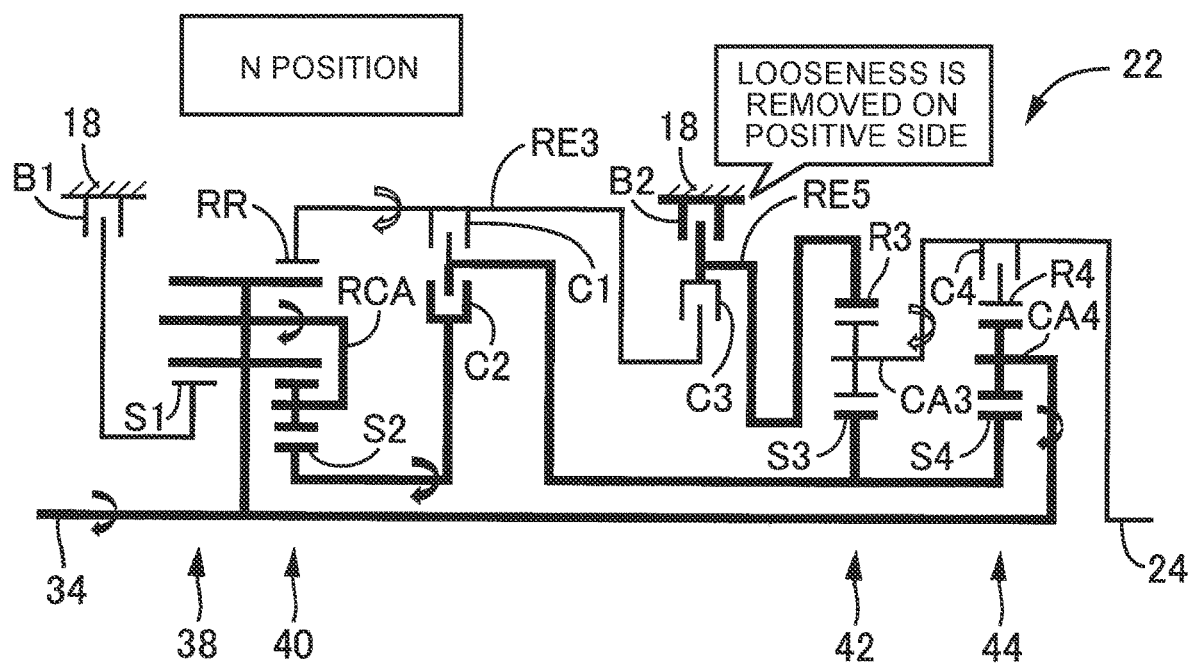
FIG. 3 is an operation chart that illustrates the relationship between a shift operation of the automatic transmission and a combination of operated engagement devices that are used for the shift operation.
FIG. 4 is a diagram that illustrates torque that acts on each rotating element in N position of the automatic transmission.

In the automatic transmission 22, for example, as shown in the engagement operation chart of FIG. 3, ten forward gear stages of first to tenth gear stages (see "1st" to "10th" in the drawing) and one reverse gear stage (see "Rev" in the drawing) are selectively established. The automatic transmission 22 may be, for example, set in a neutral state by setting any of the engagement devices CB in a released state. In the present embodiment, the automatic transmission 22 is in a neutral state (see "N" in the drawing) in a state where the second clutch C2 and the second brake B2 are in an engaged state. The neutral state of the automatic transmission 22 is a state where transmission of power is interrupted in the automatic transmission 22, that is, a state where the automatic transmission 22 is not able to transmit power. The speed ratio γ is largest in the first gear stage and reduces toward the higher-side tenth gear stage. The engagement operation chart of FIG. 3 summarizes the relationship between each gear stage that is established in the automatic transmission 22 and the operating statuses of the engagement devices CB. The circle mark indicates an engaged state, and the blank indicates a released state.

The automatic transmission 22 shifts gears when the electronic control unit 80 (described later) changes the operating statuses of predetermined ones of the engagement devices CB according to a driver's accelerator operation, a vehicle speed V, and the like. For example, in an upshift from the first gear stage to the second gear stage, the electronic control unit 80 executes a so-called clutch-to-clutch shift to release the second clutch C2 that is a releasing-side engagement device and engage the first brake B1 that is an engaging-side engagement device, as shown in the engagement operation chart of FIG. 3. At this time, a releasing transitional hydraulic pressure of the second clutch C2 and an engaging transitional hydraulic pressure of the first brake B1 are regulated. The predetermined ones of the engagement devices CB are engagement devices associated with a shift of the automatic transmission 22. The releasing-side engagement device is, of the predetermined engagement devices, the engagement device that has been in an engaged state before a shift of the automatic transmission 22 and that is changed to a released state during the shift of the automatic transmission 22, that is, the engagement device to be controlled from the engaged state toward the released state during the transition of the shift of the automatic transmission 22. The engaging-side engagement device is, of the predetermined engagement devices, the engagement device that has been in a released state before a shift of the automatic transmission 22 and that is changed to an engaged state during the shift of the automatic transmission 22, that is, the engagement device to be controlled from the released state toward the engaged state during the transition of the shift of the automatic transmission 22.

Referring back to FIG. 1, the vehicle 10 includes the electronic control unit 80 as a controller including a control apparatus for the vehicle 10, associated with, for example, shift control over the automatic transmission 22, or the like.

Thus, FIG. 1 is a diagram that shows input and output lines of the electronic control unit 80 and is a diagram that illustrates a relevant part of control functions implemented by the electronic control unit 80. The electronic control unit 80 includes a so-called microcomputer including, for example, a CPU, a RAM, a ROM, input and output interfaces, and other components. The CPU executes various control on the vehicle 10 by processing signals in accordance with programs stored in the ROM in advance while using the temporary storage function of the RAM. The electronic control unit 80 is, where necessary, separately configured for engine output control, shift control, and other control.

Various signals based on detected values from various sensors and the like provided in the vehicle 10 are supplied to the electronic control unit 80. Examples of the various sensors and the like include an engine rotation speed sensor 60, an input rotation speed sensor 62, an output rotation speed sensor 64, an accelerator operation amount sensor 66, a throttle valve opening degree sensor 68, and an operating position sensor 70. Examples of the various signals include an engine rotation speed Ne that is the rotation speed of the engine 12, the AT input rotation speed Ni (=turbine rotation speed Nt), the AT output rotation speed No corresponding to the vehicle speed V, an accelerator operation amount θacc that is the amount of operation of an accelerator pedal, a throttle valve opening degree θth that is the opening degree of an electronic throttle valve, and an operating position POSsh of a shift lever 54 that serves as a shift operating member provided in the vehicle 10.

Various command signals are supplied from the electronic control unit 80 respectively to various devices provided in the vehicle 10. Examples of the various devices include the engine controller 50 and the hydraulic control circuit 52. Examples of the various command signals include an engine control command signal Se for controlling the engine 12 and a hydraulic control command signal Sat for controlling the operating status of each engagement device CB. The hydraulic control command signal Sat is, for example, a command signal for driving each solenoid valve, or the like, in the hydraulic control circuit 52 that regulates the engaging hydraulic pressures PRcb to be supplied to the hydraulic actuators of the engagement devices CB. The hydraulic control command signal Sat is a command signal for controlling a shift of the automatic transmission 22. The electronic control unit 80 sets a command hydraulic pressure corresponding to the value of each engaging hydraulic pressure PRcb to be supplied to the associated hydraulic actuator for attaining an intended engaging torque Tcb of the engagement device CB, and outputs a driving current or driving voltage commensurate with the command hydraulic pressure to the hydraulic control circuit 52.

The shift lever 54 is an operating device for selecting multiple types of shift positions in the automatic transmission 22 through manual operation, that is, an operating device that receives a request to change the shift position of the automatic transmission 22 by being manually operated. The shift lever 54 is operated by the driver into an operating position POSsh corresponding to the shift position of the automatic transmission 22. Examples of the operating position POSsh include P operating position, R operating position, N operating position, and D operating position. The shift position of the automatic transmission 22 is synonymous with the shift range of the automatic transmission 22.

The P operating position is a parking operating position to select a parking position (=P position) of the automatic transmission 22, in which the automatic transmission 22 is placed in a neutral state and the rotation of the transmission output shaft 24 is mechanically blocked. The state where the rotation of the transmission output shaft 24 is mechanically blocked is a parking lock state where the transmission output shaft 24 is fixed to a non-rotatable state. The R operating position is a reverse travel operating position to select a reverse travel position (=R position) of the automatic transmission 22, in which reverse travel of the vehicle 10 is enabled. The N operating position is a neutral operating position to select a neutral position (=N position) of the automatic transmission 22, in which the automatic transmission 22 is placed in the neutral state. The D operating position is a forward travel operating position to select a forward travel position (=D position) of the automatic transmission 22, in which forward travel of the vehicle 10 is enabled.

The electronic control unit 80 includes an engine control unit 82 and a shift control unit 84 to implement various control in the vehicle 10.

The engine control unit 82 controls the engine 12 such that a required engine torque Te is obtained. For example, the engine control unit 82 calculates a required driving torque Tdem by applying an accelerator operation amount θacc and a vehicle speed V to, for example, a driving force map that is a relationship obtained and stored in advance experimentally or in design, that is, a predetermined relationship. The engine control unit 82 outputs an engine control command signal Se for obtaining an engine torque Te to achieve the required driving torque Tdem to the engine controller 50 in consideration of an auxiliary load, the speed ratio γ of the automatic transmission 22, and other information.

The shift control unit 84 executes shift control over the automatic transmission 22. For example, the shift control unit 84 outputs hydraulic control command signals Sat for changing the operating statuses of the engagement devices CB to the hydraulic control circuit 52 so as to change the shift position of the automatic transmission 22 based on the operating position POSsh. In the D position of the automatic transmission 22, the shift control unit 84 determines whether the gear stage of the automatic transmission 22 needs to be changed by using, for example, a shift map that is a predetermined relationship, and, when the shift control unit 84 makes a shift determination that the gear stage needs to be changed, outputs hydraulic control command signals Sat for changing the operating statuses of the engagement devices CB to the hydraulic control circuit 52 so as to change the gear stage of the automatic transmission 22.

Incidentally, inside the automatic transmission 22, there is a backlash (also referred to as looseness) that is a clearance between two parts that interact in a rotation direction. Depending on a difference in the shift position of the automatic transmission 22 or a difference in the gear stage of the automatic transmission 22, the direction in which looseness is removed varies or looseness is not removed between the same parts. For this reason, in shift control over the automatic transmission 22, between some parts, the direction in which looseness is removed changes or the status changes from the state where looseness is not removed to the state where looseness is removed. At this time, shock due to torque that is generated by rattling (=tooth hammer) resulting from removal of looseness may occur. The direction in which looseness is removed is defined that, where, for example, a rotation direction corresponding to a forward travel direction of the vehicle 10 is a positive rotation direction, looseness that is removed by torque that acts in the positive rotation direction is positive. In the present embodiment, shock at the time of rattling is referred to as rattling shock.

On the other hand, in shift control over the automatic transmission 22, a command hydraulic pressure for an engaging-side engagement device is set to, for example, a value commensurate with an AT input torque Ti in consideration of a reduction of shift shock and a shift time. In the present embodiment, a command hydraulic pressure set to such a value is referred to as ordinary command hydraulic pressure. It is conceivable that, in shift control over the automatic transmission 22, the above-described rattling shock is reduced by, for example, gently engaging the engaging-side engagement device through an increase in command hydraulic pressure slower than the ordinary command hydraulic pressure. However, if the engaging-side engagement device is gently engaged, the progress of the shift can stop to lead to a decrease in drivability.

In the present embodiment, in shift control over the automatic transmission 22, rattling shock is reduced not by gently engaging the engaging-side engagement device. Rattling shock is reduced by temporarily reducing the torque capacity of an engagement device different from the engaging-side engagement device while a command hydraulic pressure for the engaging-side engagement device remains set to the ordinary command hydraulic pressure. Hereinafter, the control will be described in detail.

Figure 5:
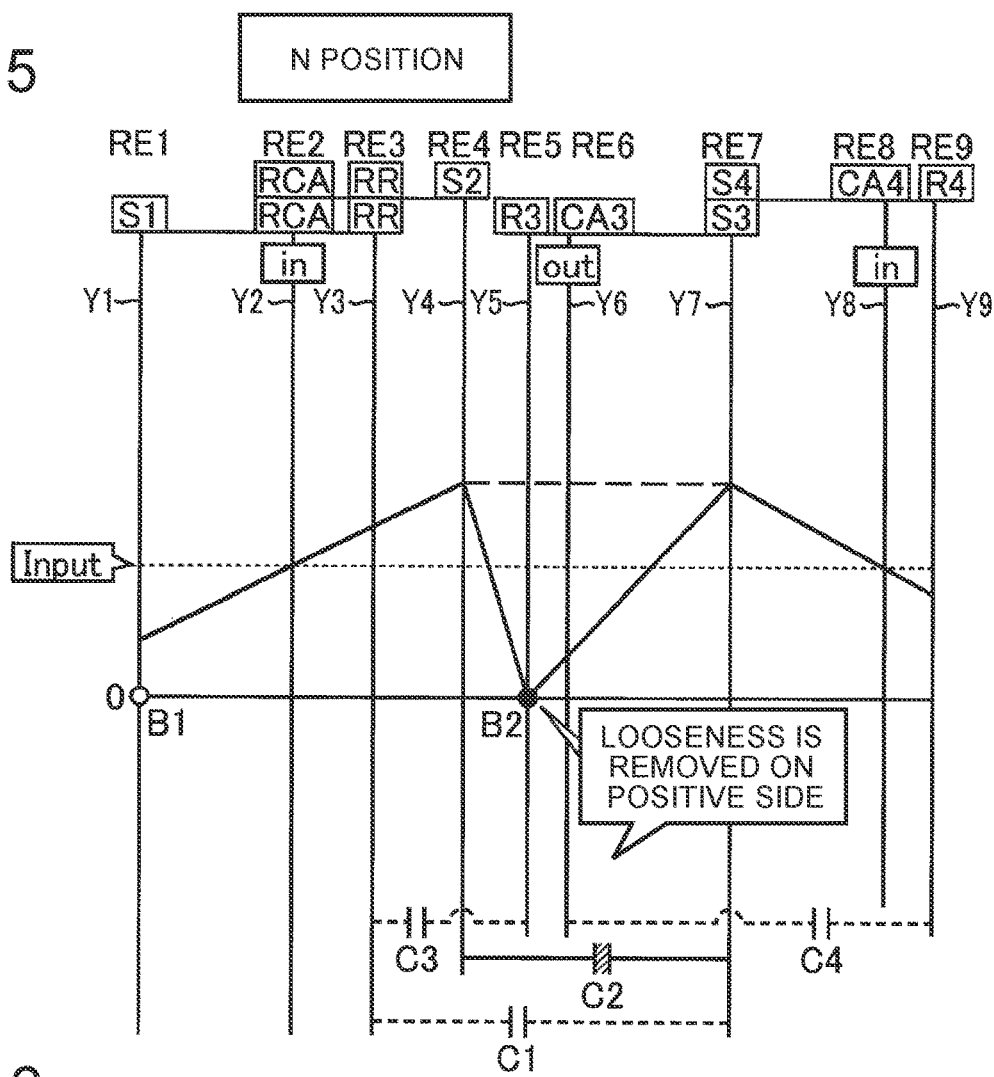
FIG. 5 is a view that shows statuses of rotation speeds of rotating elements in the N position of the automatic transmission on a nomograph.
Figure 6:
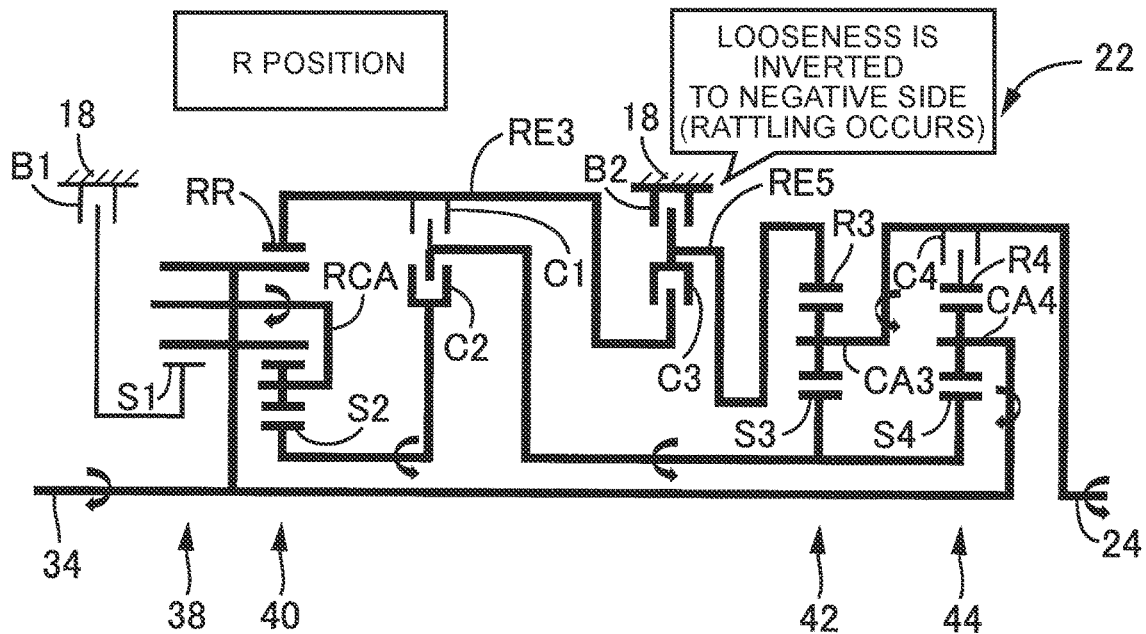
FIG. 6 is a diagram that illustrates torque that acts on each rotating element in R position of the automatic transmission.
Figure 7:
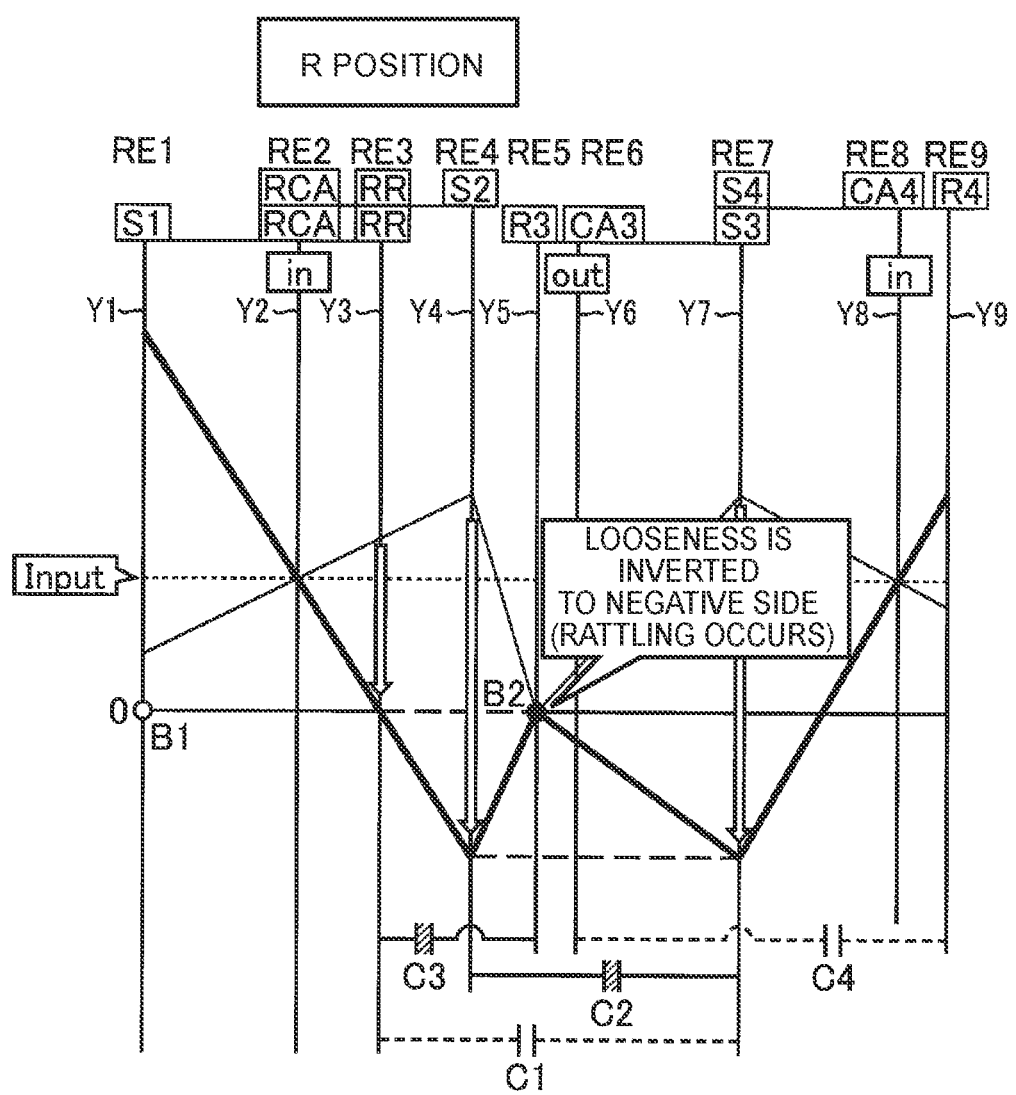
FIG. 7 is a view that shows statuses of rotation speeds of the rotating elements in the R position of the automatic transmission on the nomograph.

FIG. 4 is a diagram that illustrates torque that acts on each rotating element in the N position of the automatic transmission 22. FIG. 5 is a view that shows the statuses of rotation speeds of the rotating elements in the N position of the automatic transmission 22 on a nomograph. FIG. 6 is a diagram that illustrates torque that acts on each rotating element in the R position of the automatic transmission 22. FIG. 7 is a view that shows the statuses of rotation speeds of the rotating elements in the R position of the automatic transmission 22 on a nomograph. FIG. 4 to FIG. 7 illustrate cases (see "Input" in the drawings) where the AT input torque Ti is applied to keep a constant AT input rotation speed Ni in a state of no load from a road surface due to vehicle weight, or the like, in the automatic transmission 22 in itself.

In FIG. 4 and FIG. 6, the arrows in the skeletal diagram of the automatic transmission 22 each represent the direction of torque that acts on each rotating element. A clockwise direction of the arrow is positive. In FIG. 4 and FIG. 6, the lower half below the axis of the transmission input shaft 34 is omitted from the skeletal diagram of the automatic transmission 22, shown in FIG. 2.

The nomographs shown in FIG. 5 and FIG. 7 are views that each show the relative relationship in rotation speed among the rotating elements of the automatic transmission 22. In FIG. 5 and FIG. 7, nine vertical lines Y1, Y2, Y3, Y4, Y5, Y6, Y7, Y8, Y9 correspond to the nine rotating elements of the automatic transmission 22. The vertical line Y1 is an axis that represents the rotation speed of the first sun gear S1 corresponding to a first rotating element RE1. The vertical line Y2 is an axis that represents the rotation speed of the carrier RCA corresponding to a second rotating element RE2. The vertical line Y3 is an axis that represents the rotation speed of the ring gear RR corresponding to a third rotating element RE3. The vertical line Y4 is an axis that represents the rotation speed of the second sun gear S2 corresponding to a fourth rotating element RE4. The vertical line Y5 is an axis that represents the rotation speed of the third ring gear R3 corresponding to a fifth rotating element RE5. The vertical line Y6 is an axis that represents the rotation speed of the third carrier CA3 corresponding to a sixth rotating element RE6. The vertical line Y7 is an axis that represents the rotation speed of each of the mutually coupled third sun gear S3 and fourth sun gear S4 corresponding to a seventh rotating element RE7. The vertical line Y8 is an axis that represents the rotation speed of the fourth carrier CA4 corresponding to an eighth rotating element RE8. The vertical line Y9 is an axis that represents the rotation speed of the fourth ring gear R4 corresponding to a ninth rotating element RE9. The second rotating element RE2 and the eighth rotating element RE8 are coupled to the transmission input shaft 34 (see "in" in the drawing). The sixth rotating element RE6 is coupled to the transmission output shaft 24 (see "out" in the drawing). The third rotating element RE3 and the seventh rotating element RE7 are selectively coupled via the first clutch C1. The fourth rotating element RE4 and the seventh rotating element RE7 are selectively coupled via the second clutch C2. The third rotating element RE3 and the fifth rotating element RE5 are selectively coupled via the third clutch C3. The sixth rotating element RE6 and the ninth rotating element RE9 are selectively coupled via the fourth clutch C4. The first rotating element RE1 is selectively coupled to the case 18 via the first brake B1. The fifth rotating element RE5 is selectively coupled to the case 18 via the second brake B2.

In FIG. 4 and FIG. 5, in the N position of the automatic transmission 22, the second clutch C2 and the second brake B2 are in an engaged state. In the automatic transmission 22, even when the second clutch C2 and the second brake B2 are in an engaged state, but when the first clutch C1 or the third clutch C3 is in a released state, the N position is established. In the N position of the automatic transmission 22, for example, in preparation for establishing the first gear stage or the reverse gear stage, the second clutch C2 and the second brake B2 are placed in an engaged state in advance. In the thus configured N position of the automatic transmission 22, in a state of no load from a road surface, torque that causes the transmission output shaft 24 to rotate in the positive direction is generated by a drag of the engagement devices placed in a released state. For this reason, looseness at the spline fitting portion between the second brake B2 and the case 18 is removed on the positive side.

On the other hand, in FIG. 6 and FIG. 7, in the R position of the automatic transmission 22, the second clutch C2, the third clutch C3, and the second brake B2 are in an engaged state. In the R position of the automatic transmission 22, looseness at the spline fitting portion between the second brake B2 and the case 18 is removed on the negative side by torque that acts on the rotating elements. Therefore, in shift control to change the automatic transmission 22 from the N position to the R position, the direction in which looseness is removed is inverted from the positive side to the negative side, and rattling occurs. In the R position, the third rotating element RE3 and the fifth rotating element RE5 are united by engaging the third clutch C3, so inertia that occurs when coupled to the case 18 by engaging the second brake B2 increases. For this reason, in shift control to change the automatic transmission 22 from the N position to the R position, large rattling shock may occur.

In shift control to change the automatic transmission 22 from the N position to the R position, the electronic control unit 80 places the second brake B2 in a slip state (=half-engaged state) by temporarily reducing the torque capacity of the second brake B2 placed in an engaged state during the transition of the shift. Thus, transmission of torque that is generated by rattling is reduced, so rattling shock can be reduced. In shift control to change the automatic transmission 22 from the N position to the R position, a command hydraulic pressure for the third clutch C3 is set to, for example, a value commensurate with the AT input torque Ti in consideration of a reduction of shift shock and a shift time. Thus, a stop of the shift due to a delay in change into an engaged state of the third clutch C3 can be prevented.

In shift control to change the automatic transmission 22 from the N position to the R position as described above, the third clutch C3 is an engaging-side engagement device. The fifth rotating element RE5 that is coupled to the case 18 by engaging the second brake B2 is a predetermined rotating element in the automatic transmission 22, which bears a reaction caused by the progress of the shift resulting from a change of the third clutch C3 into an engaged state. The second brake B2 whose torque capacity is temporarily reduced during the transition of the shift is an engagement device different from predetermined ones of the engagement devices CB, associated with the shift of the automatic transmission 22, and is originally maintained in an engaged state during the transition of the shift. The second brake B2 is an engagement device that fixes the rotation of one of rotating members of the third clutch C3 for the progress of the shift of the automatic transmission 22. In other words, the second brake B2 is a reaction engagement device that is maintained in an engaged state from before the shift to after the shift such that the fifth rotating element RE5 bears a reaction caused by the progress of the shift resulting from a change of the third clutch C3 into an engaged state. In the present embodiment, the reaction engagement device is also referred to as reaction element. The engaging-side engagement device is an engagement device to control the progress of the shift. In the present embodiment, the engaging-side engagement device is also referred to as control element.

The shift control unit 84 executes torque reduction control for temporarily reducing the torque capacity of a reaction engagement device during a transition of a shift. The reaction engagement device is maintained in an engaged state from before the shift to after the shift such that the predetermined rotating element in the automatic transmission 22 bears a reaction caused by the progress of the shift of the automatic transmission 22 resulting from a change of the engaging-side engagement device into an engaged state.

More specifically, at the time when rattling occurs during a transition of a shift of the automatic transmission 22, it is desirable that the torque capacity of the reaction engagement device be temporarily reduced. The shift control unit 84 executes torque reduction control by setting a command pressure, that is, a command hydraulic pressure, for controlling the torque capacity of the reaction engagement device such that the torque capacity is reduced as compared to that at the time when looseness in the automatic transmission 22 is removed with the shift of the automatic transmission 22. For example, the shift control unit 84 starts torque reduction control just after the start of shift control over the automatic transmission 22. In other words, when the shift control unit 84 starts shift control over the automatic transmission 22, the shift control unit 84 outputs a command hydraulic pressure to temporarily decrease the engaging hydraulic pressure PRcb of the reaction engagement device.

The command hydraulic pressure to temporarily decrease the engaging hydraulic pressure PRcb of the reaction engagement device is also a predetermined value for, for example, reducing transmission of torque that is generated at the time of rattling due to removal of looseness in the automatic transmission 22 with a shift of the automatic transmission 22. The shift control unit 84 sets a command hydraulic pressure to reduce the torque capacity of the reaction engagement device such that transmission of torque that is generated at the time of rattling with a shift of the automatic transmission 22 is reduced.

As a slip rotation speed (=differential rotation speed) of the reaction engagement device increases, torque is more difficult to be transmitted, that is, the sensitivity of transmission of torque is more reduced. On the other hand, it is presumable that the magnitude of torque to be generated as a result of rattling varies among the types of shift of the automatic transmission 22. For example, as described above, in shift control to change the automatic transmission 22 from the N position to the R position, large rattling shock may occur. During shift control over the automatic transmission 22, in which large rattling shock occurs, it is desirable that the sensitivity of transmission of torque be reduced. The shift control unit 84 sets a command hydraulic pressure to reduce the torque capacity of the reaction engagement device according to an intended sensitivity of transmission of torque for the type of shift of the automatic transmission 22, that is, according to a slip rotation speed of the reaction engagement device that is placed in a half-engaged state in torque reduction control. When the reaction engagement device is, for example, the second brake B2 that couples the third ring gear R3 to the case 18, the slip rotation speed of the second brake B2 is the rotation speed of the third ring gear R3. The rotation speed of the third ring gear R3 is detected by, for example, a rotation speed sensor (not shown) or calculated by using values of rotation speed sensors that respectively detect rotation speeds of a plurality of rotating elements different from the third ring gear R3.

The engaging hydraulic pressure PRcb is temporarily decreased and then the engaging hydraulic pressure PRcb is increased again. Thus, the reaction engagement device is returned to an engaged state. The level to which the engaging hydraulic pressure PRcb is temporarily decreased is desirably an engaging hydraulic pressure PRcb to such an extent that response at the time of returning the reaction engagement device to an engaged state is appropriately ensured. It is presumable that the response of an engagement device at the time of returning the engagement device to an engaged state depends on predetermined specifications in hardware aspect, such as a clearance and elastic deformation of each friction material. The shift control unit 84 sets a command hydraulic pressure to reduce the torque capacity of the reaction engagement device according to the predetermined specifications of the reaction engagement device.

The engaging hydraulic pressure PRcb of the reaction engagement device just needs to be temporarily decreased at the time of rattling with a shift of the automatic transmission 22. It is desirable that the reaction engagement device be quickly returned to an engaged state after rattling. For example, to terminate shift control as a result of a change of the engaging-side engagement device into an engaged state, it is desirable that the reaction engagement device be returned to an engaged state before the engaging-side engagement device that is controlled by the ordinary command hydraulic pressure is changed into an engaged state. After looseness in the automatic transmission 22 is removed with a shift of the automatic transmission 22, the shift control unit 84 sets a command hydraulic pressure such that the reaction engagement device is returned to an engaged state before completion of control to change the engaging-side engagement device into an engaged state. The time at which looseness in the automatic transmission 22 is removed with a shift of the automatic transmission 22 is, for example, the time of the start of inertia phase in a transition of the shift of the automatic transmission 22.

Figure 8:
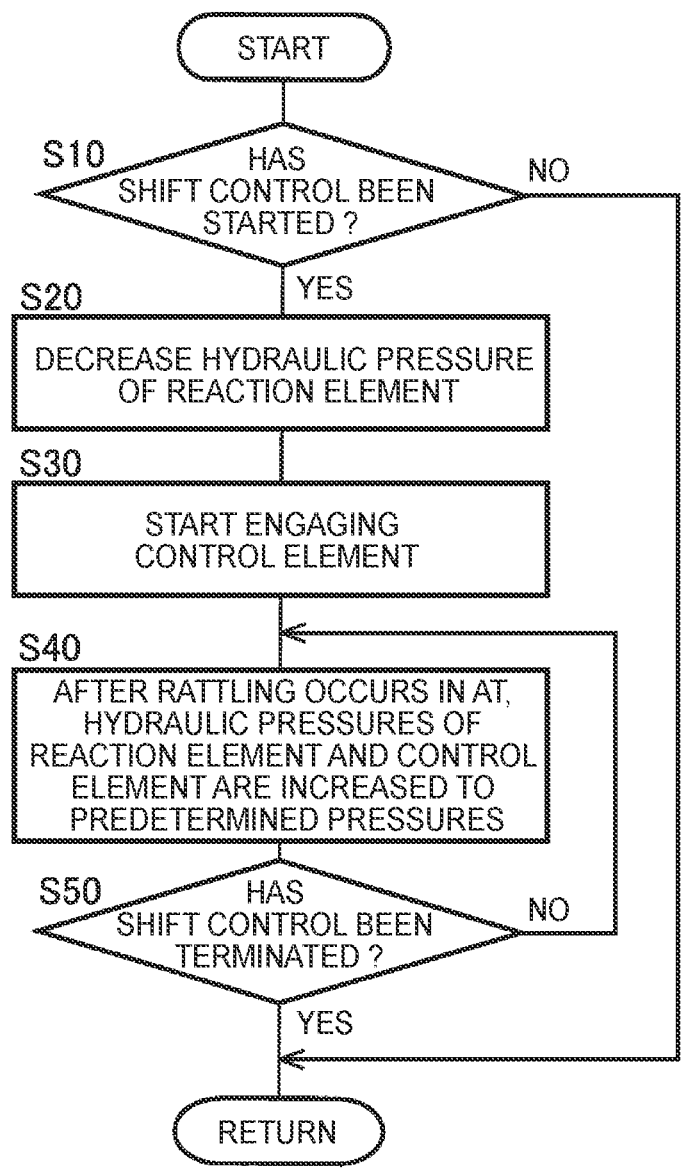
FIG. 8 is a flowchart that illustrates a relevant part of control operations of an electronic control unit, that is, control operations for reducing shock at the time of rattling while preventing a stop of a shift due to a delay in change of an engaging-side engagement device into an engaged state in shift control over the automatic transmission.
Figure 9:
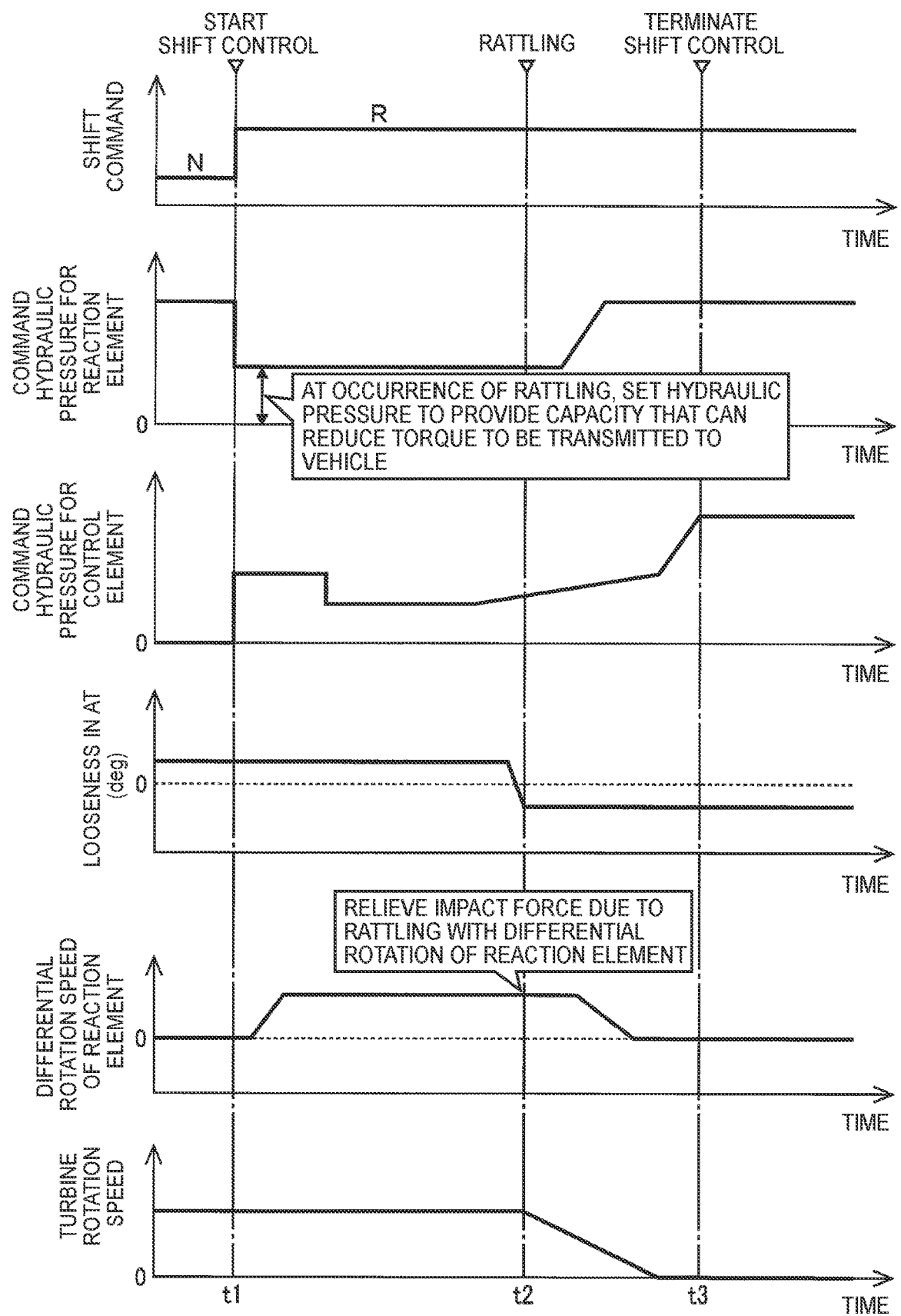
FIG. 9 is a view that shows an example of a timing chart when the control operations shown in the flowchart of FIG. 8 are executed.

FIG. 8 is a flowchart that illustrates a relevant part of control operations of the electronic control unit 80, that is, control operations for reducing shock at the time of rattling while preventing a stop of a shift due to a delay in change of an engaging-side engagement device into an engaged state in shift control over the automatic transmission 22. The flowchart is, for example, repeatedly executed. FIG. 9 is an example of a timing chart when control operations shown in the flowchart of FIG. 8 are executed.

In FIG. 8, first, in step (hereinafter, step is omitted) corresponding to the function of the shift control unit 84, it is determined whether shift control over the automatic transmission 22 has been started. When negative determination is made in S10, the routine is ended. When affirmative determination is made in S10, a command hydraulic pressure to temporarily decrease the engaging hydraulic pressure PRcb of a reaction element (=reaction engagement device) is output in S20 corresponding to the function of the shift control unit 84. Subsequently, in S30 corresponding to the function of the shift control unit 84, output of a command hydraulic pressure for changing a control element (=engaging-side engagement device) into an engaged state is started. After that, in S40 corresponding to the function of the shift control unit 84, after rattling has occurred in the automatic transmission 22, command hydraulic pressures to increase the engaging hydraulic pressures PRcb of the reaction element and control element toward respective predetermined pressures are output. The predetermined pressures are hydraulic pressures by which the reaction element and the control element can be maintained in an engaged state and vary between the reaction element and the control element. Then, in S50 corresponding to the function of the shift control unit 84, it is determined whether shift control over the automatic transmission 22 has been terminated based on whether both the command hydraulic pressures for the reaction element and the control element have been increased to the predetermined pressures. When negative determination is made in S50, the process is returned to S40. When affirmative determination is made in S50, the routine is ended.

FIG. 9 is a view that shows an example of shift control to change the automatic transmission 22 from the N position to the R position during a stop of the vehicle 10. In FIG. 9, time t1 represents a time at which output of a hydraulic control command signal Sat for executing shift control to change the automatic transmission 22 from the N position to the R position has been started. As shift control is started, the command hydraulic pressure for the reaction element placed in an engaged state is temporarily decreased (see after time t1). The command hydraulic pressure for the reaction element when temporarily decreased is set to a hydraulic pressure by which the torque capacity that can reduce torque to be transmitted to the vehicle 10 at the time of rattling is obtained. Thus, the reaction element is placed in a half-engaged state, and a differential rotation speed occurs. In this shift control, an ordinary command hydraulic pressure to change the control element into an engaged state is output. As the shift of the automatic transmission 22 progresses, rattling occurs (see time t2). Impact force due to rattling is relieved by the differential rotation speed of the reaction element. After occurrence of rattling, before a change of the control element into an engaged state completes, a command hydraulic pressure for the reaction element is increased so as to return the reaction element to an engaged state (see from time t2 to time t3). A change of the control element into an engaged state completes, and shift control is terminated (see time t3).

As described above, according to the present embodiment, torque reduction control is executed for temporarily reducing a torque capacity of a reaction engagement device during a transition of a shift. The reaction engagement device is maintained in an engaged state from before the shift to after the shift such that a predetermined rotating element in an automatic transmission 22 bears a reaction caused by progress of the shift resulting from a change of an engaging-side engagement device into an engaged state. Therefore, without delaying a change of the engaging-side engagement device into an engaged state, transmission of torque that is generated as a result of rattling during the transition of the shift is reduced. Thus, in shift control over the automatic transmission 22, shock at the time of rattling is reduced while a stop of the shift due to a delay in change of the engaging-side engagement device into an engaged state is prevented.

According to the present embodiment, the torque reduction control is executed by setting a command hydraulic pressure for controlling the torque capacity of the reaction engagement device such that the torque capacity is reduced before looseness in the automatic transmission 22 is removed with the shift of the automatic transmission 22. Therefore, transmission of torque that is generated as a result of rattling during the transition of the shift is appropriately reduced.

According to the present embodiment, a command hydraulic pressure for reducing the torque capacity of the reaction engagement device is set according to a slip rotation speed of the reaction engagement device. Therefore, the sensitivity of transmission of torque that varies with the slip rotation speed of the reaction engagement device can be set to a desired level. Thus, transmission of torque is appropriately reduced at a slip rotation speed of the reaction engagement device appropriate for each type of a shift that varies in the magnitude of torque that is generated as a result of rattling.

According to the present embodiment, the command hydraulic pressure for reducing the torque capacity of the reaction engagement device is set according to predetermined specifications of the reaction engagement device. Therefore, such a command pressure that the response at the time of returning the reaction engagement device to an engaged state is appropriately ensured can be set.

According to the present embodiment, the command hydraulic pressure for reducing the torque capacity of the reaction engagement device is set such that transmission of torque that is generated at the time of rattling is reduced. Therefore, transmission of torque that is generated as a result of rattling during the transition of the shift is appropriately reduced.

According to the present embodiment, after looseness in the automatic transmission 22 is removed with the shift of the automatic transmission 22, the command hydraulic pressure is set such that the reaction engagement device is returned to an engaged state before completion of control for changing the engaging-side engagement device to an engaged state. Therefore, a delay in termination of shift control due to torque reduction control is prevented.

Next, another embodiment of the disclosure will be described. Like reference numerals denote portions mutually common to the embodiments in the following description, and the description thereof will not be repeated.

Second Embodiment

In the above-described first embodiment, torque reduction control is executed in shift control over the automatic transmission 22. Torque reduction control may be executed only in shift control that may cause large rattling shock. In other words, a shift of the automatic transmission 22 on which torque reduction control is executed is a predetermined shift that requires a reduction of shock at the time of rattling caused by removal of looseness in the automatic transmission 22. The predetermined shift is, for example, shift control to change the automatic transmission 22 from the N position to the R position.

Figure 10:
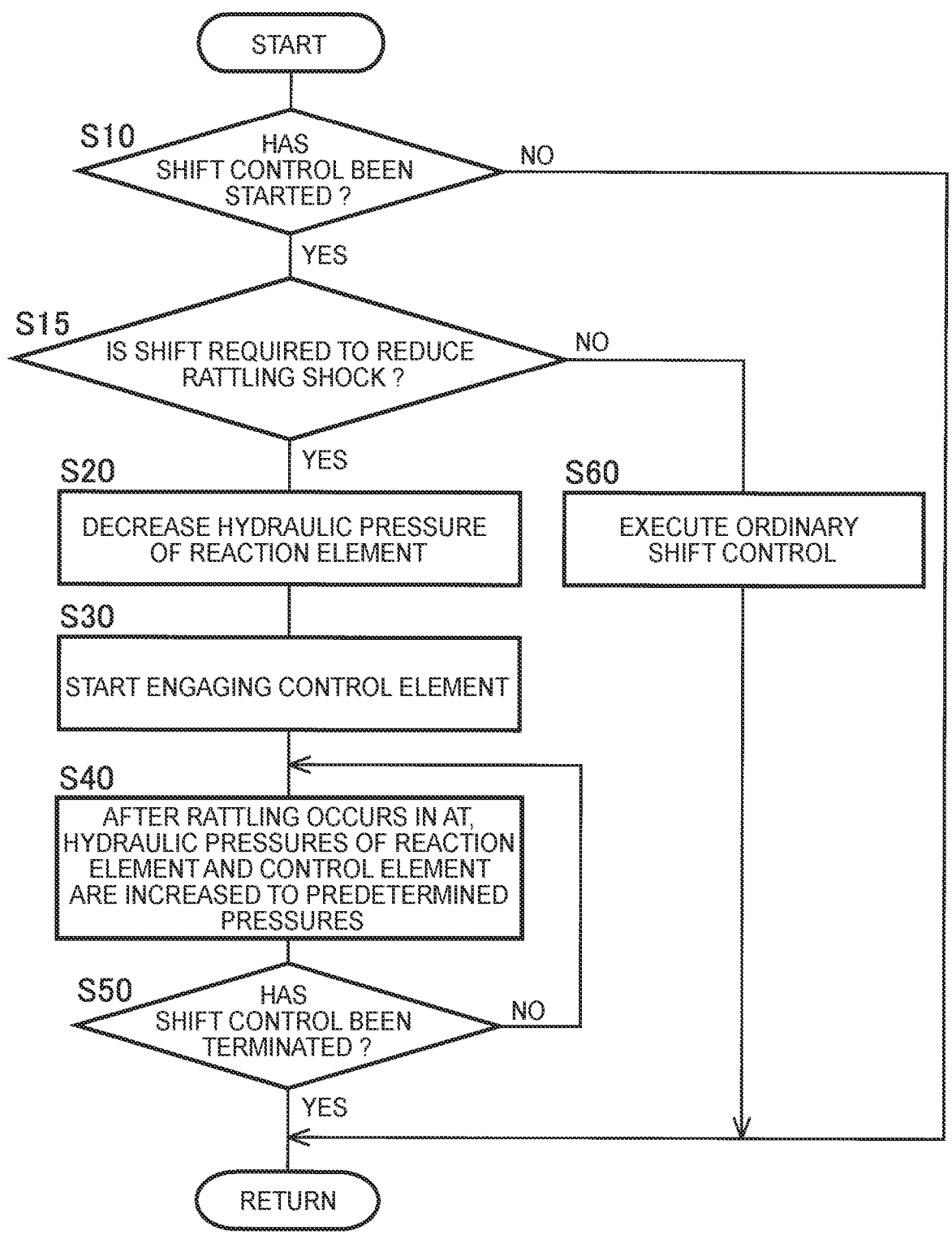
FIG. 10 is a flowchart that illustrates a relevant part of control operations of an electronic control unit, that is, control operations for reducing shock at the time of rattling while preventing a stop of a shift due to a delay in change of an engaging-side engagement device into an engaged state in shift control over the automatic transmission, and shows an embodiment different from FIG. 8.

FIG. 10 is a flowchart that illustrates a relevant part of control operations of the electronic control unit 80, that is, control operations for reducing shock at the time of rattling while preventing a stop of a shift due to a delay in change of an engaging-side engagement device into an engaged state in shift control over the automatic transmission 22. The flowchart is, for example, repeatedly executed. FIG. 10 is an embodiment different from FIG. 8.

Portions in FIG. 10, different from those of FIG. 8, will be mainly described. When affirmative determination is made in S10, it is determined in S15 corresponding to the function of the shift control unit 84, whether the shift is a predetermined shift that requires a reduction of shock at the time of rattling caused by removal of looseness in the automatic transmission 22. When affirmative determination is made in S15, steps from S20 are executed. When negative determination is made in S15, ordinary shift control in which torque reduction control is not executed in shift control is executed in S60 corresponding to the function of the shift control unit 84.

As described above, according to the present embodiment, a shift of the automatic transmission 22, in which the torque reduction control is executed, is a predetermined shift that requires a reduction of shock at the time of rattling. Therefore, in a shift that does not require a reduction of shock at the time of rattling, torque reduction control over the automatic transmission 22 is not executed, so there is no possibility that a duration required for shift control extends because of torque reduction control over the automatic transmission 22, and shift control is simple.

The embodiments of the disclosure are described in detail with reference the drawings; however, the disclosure is also applicable to other embodiments.

For example, in the above-described embodiments, the gear stages of ten forward gears are established in the automatic transmission 22; however, the configuration is not limited to this mode. For example, the automatic transmission 22 just needs to be an automatic transmission in which a plurality of gear stages is selectively established. Other than a planetary gear automatic transmission like the automatic transmission 22, the automatic transmission may be an automatic transmission, such as a known dual clutch transmission (DCT) that is a synchromesh-type two parallel shaft automatic transmission and that is a transmission of a type in which two lines of input shafts are provided and engagement devices (clutches) are respectively connected to the lines and further respectively connected to even-numbered stages and odd-numbered stages. In short, as long as a vehicle includes an automatic transmission that shifts gears by changing the operating statuses of predetermined ones of a plurality of engagement devices, the disclosure is applicable. In the case of a DCT, the predetermined engagement devices correspond to engagement devices respectively connected to input shafts of two lines.

In the above-described embodiment, the engine 12 is illustrated as the power source of the vehicle 10; however, the power source is not limited to this mode. For example, another motor, such as an electric motor, may be employed as the power source solely or in combination with the engine 12. The power of the engine 12 is transmitted to the automatic transmission 22 via the torque converter 20 as a fluid transmission device; however, the configuration is not limited to this mode. For example, the fluid transmission device may be another fluid transmission device, such as a fluid coupling with no torque amplification function, instead of the torque converter 20. Alternatively, the fluid transmission device is not necessarily provided.

The above-described embodiments are only illustrative. The disclosure may be implemented in modes including various modifications or improvements based on the knowledge of persons skilled in the art.

What is claimed is:

1. A control apparatus for a vehicle including an automatic transmission that shifts gears by changing operating statuses of predetermined ones of a plurality of engagement devices, the control apparatus comprising:
a shift control unit configured to execute torque reduction control, the torque reduction control being control for temporarily reducing a torque capacity of a reaction engagement device different from the predetermined ones of the plurality of engagement devices, the reaction engagement device being maintained in an engaged state from before the shift to after the shift such that a predetermined rotating element in the automatic transmission bears a reaction caused by progress of the shift resulting from a change of an engaging-side one of the predetermined engagement devices, which has been in a released state before the shift, into an engaged state.

2. The control apparatus according to claim 1, wherein the shift on which the torque reduction control is executed is a predetermined shift that requires a reduction of shock at the time of rattling caused by removal of looseness in the automatic transmission.

3. The control apparatus according to claim 1, wherein the shift control unit is configured to execute the torque reduction control by setting a command pressure for controlling the torque capacity of the reaction engagement device such that the torque capacity is reduced before looseness in the automatic transmission is removed with the shift.

4. The control apparatus according to claim 3, wherein the shift control unit is configured to set the command pressure for reducing the torque capacity of the reaction engagement device according to a slip rotation speed of the reaction engagement device that is half engaged in the torque reduction control.

5. The control apparatus according to claim 3, wherein the shift control unit is configured to set the command pressure for reducing the torque capacity of the reaction engagement device according to predetermined specifications of the reaction engagement device.

6. The control apparatus according to claim 3, wherein the shift control unit is configured to set the command pressure for reducing the torque capacity of the reaction engagement device such that transmission of torque that is generated at the time of rattling caused by removal of looseness resulting from the shift in the automatic transmission is reduced.

7. The control apparatus according to claim 3, wherein the shift control unit is configured to, after looseness in the automatic transmission is removed with the shift, set the command pressure for returning the reaction engagement device to an engaged state before completion of control for changing the engaging-side engagement device into the engaged state.

\* \* \* \* \*